(12) United States Patent
Manuel et al.

(10) Patent No.: US 8,108,982 B2
(45) Date of Patent: Feb. 7, 2012

(54) COMPOUND MOLD TOOLING FOR CONTROLLED HEAT TRANSFER

(75) Inventors: Mark Manuel, Shelby Township, MI (US); Thomas N. Greaves, Rochester Hills, MI (US); Matthew T. Lowney, Davisburg, MI (US); Michael Wasylenko, Metamora, MI (US)

(73) Assignee: Floodcooling Technologies, L.L.C., Bloomfield Hills, MI (US)

( * ) Notice: Subject to any disclaimer, the term of this patent is extended or adjusted under 35 U.S.C. 154(b) by 1221 days.

(21) Appl. No.: 11/780,010

(22) Filed: Jul. 19, 2007

(65) Prior Publication Data

US 2008/0003323 A1    Jan. 3, 2008

Related U.S. Application Data

(63) Continuation-in-part of application No. 11/484,475, filed on Jul. 11, 2006, now abandoned, which is a continuation-in-part of application No. 11/037,615, filed on Jan. 18, 2005, now Pat. No. 7,278,197, and a continuation-in-part of application No. 11/233,708, filed on Sep. 23, 2005, now abandoned.

(51) Int. Cl.
*B23P 17/00* (2006.01)
*B28B 17/00* (2006.01)
*B22D 27/04* (2006.01)

(52) U.S. Cl. ............... 29/527.5; 29/527.3; 29/527.2; 29/527.4; 29/527.6; 425/470; 425/446; 425/508; 425/509; 249/80; 249/111; 164/98; 164/348

(58) Field of Classification Search .............. 29/527.5, 29/527.3, 527.1, 527.2, 527.6, 527.4; 425/446, 425/508, 509, 470, DIG. 30; 249/80, 79, 111, 135; 164/98, 126, 128, 348

See application file for complete search history.

(56) References Cited

U.S. PATENT DOCUMENTS 2,458,427 A    1/1949 Russell et al.
2,737,456 A    3/1956 Haller
(Continued)

FOREIGN PATENT DOCUMENTS

DE    3808363 A1    9/1989
(Continued)

OTHER PUBLICATIONS

International Search Report and Written Opinion of International Patent Application PCT/US2007/072925, mailed Dec. 12, 2007, 13 pages.

(Continued)

*Primary Examiner* — Essama Omgba
(74) *Attorney, Agent, or Firm* — Brooks Kushman P.C.

(57) ABSTRACT

In one embodiment, a tool for forming an article in a molding operation has a tool body formed from a non-particulate material, with a particulate material bonded to the body. The body provides a forming surface for forming the article. The particulate material, or the particulate material and the tool body collectively provide a duct for conveying a fluid for transfer of heat with the forming surface. In another embodiment, the tool has a tool body formed from a non-particulate material with a cavity and the particulate material is disposed within the cavity. A heat transfer material is disposed in the cavity bonding the particulate material to the tool body. Methods for manufacturing such tools are also disclosed.

38 Claims, 8 Drawing Sheets

U.S. PATENT DOCUMENTS

| | | | |
|---|---|---|---|
| 2,811,761 A | | 11/1957 | Bauer |
| 3,416,766 A | | 12/1968 | Miller |
| 3,638,299 A | * | 2/1972 | Garner et al. ............... 29/527.2 |
| 3,723,584 A | | 3/1973 | Nussbaum |
| 3,784,152 A | * | 1/1974 | Garner et al. ............... 249/80 |
| 3,811,175 A | | 5/1974 | Garner et al. |
| 3,915,699 A | | 10/1975 | Umehara et al. |
| 4,531,705 A | | 7/1985 | Nakagawa et al. |
| 4,702,969 A | | 10/1987 | Bunkoczy et al. |
| 4,867,412 A | | 9/1989 | Greune |
| 5,031,483 A | * | 7/1991 | Weaver ............... 76/107.1 |
| 5,189,781 A | * | 3/1993 | Weiss et al. ............... 29/527.2 |
| 5,345,052 A | | 9/1994 | Puddephatt |
| 5,437,547 A | | 8/1995 | Holton et al. |
| 5,439,622 A | | 8/1995 | Pennisi et al. |
| 5,641,448 A | | 6/1997 | Yeung et al. |
| 5,775,402 A | | 7/1998 | Sachs et al. |
| 5,779,833 A | | 7/1998 | Cawley et al. |
| 5,792,492 A | | 8/1998 | Takahashi |
| 5,793,015 A | | 8/1998 | Walczyk |
| 5,814,161 A | | 9/1998 | Sachs et al. |
| 5,847,958 A | | 12/1998 | Shaikh et al. |
| 5,855,933 A | | 1/1999 | Schmetz |
| 5,878,619 A | | 3/1999 | Walczak |
| 6,109,332 A | | 8/2000 | Sachs et al. |
| 6,167,940 B1 | * | 1/2001 | Lonardi et al. ............... 164/416 |
| 6,209,847 B1 | | 4/2001 | Frul |
| 6,276,053 B1 | | 8/2001 | Sinnesal |
| 6,354,361 B1 | | 3/2002 | Sachs et al. |
| 6,536,088 B1 | | 3/2003 | Chiang |
| 6,587,742 B2 | | 7/2003 | Manuel et al. |
| 6,627,835 B1 | | 9/2003 | Chung et al. |
| 7,021,523 B2 | | 4/2006 | Manuel |
| 7,195,223 B2 | | 3/2007 | Manuel et al. |
| 7,222,834 B2 | | 5/2007 | Manuel et al. |
| 7,607,211 B2 | * | 10/2009 | Barlier et al. ............... 29/557 |
| 2002/0100858 A1 | | 8/2002 | Weber |
| 2002/0165634 A1 | | 11/2002 | Skszek |
| 2002/0175265 A1 | | 11/2002 | Bak et al. |
| 2003/0042653 A1 | | 3/2003 | Jiang et al. |
| 2004/0038074 A1 | | 2/2004 | Manuel |
| 2004/0128016 A1 | | 7/2004 | Stewart |
| 2004/0211047 A1 | | 10/2004 | Moushon et al. |
| 2004/0247725 A1 | | 12/2004 | Lang et al. |
| 2005/0263673 A1 | * | 12/2005 | Bachan ............... 249/79 |
| 2006/0055085 A1 | | 3/2006 | Nakagawa et al. |
| 2006/0157877 A1 | | 7/2006 | Manuel |
| 2006/0249872 A1 | | 11/2006 | Manuel et al. |
| 2007/0102837 A1 | | 5/2007 | Manuel et al. |
| 2008/0003323 A1 | * | 1/2008 | Manuel et al. ............... 425/447 |

FOREIGN PATENT DOCUMENTS

| | | | |
|---|---|---|---|
| DE | 19533045 A1 | 3/1997 | |
| EP | 0742094 A1 | 11/1996 | |
| EP | 0775550 A1 | 5/1997 | |
| GB | 1308344 | 2/1973 | |
| JP | S59218228 A | 12/1984 | |
| JP | 61032728 A | 2/1986 | |
| JP | H04086212 A | 3/1992 | |
| JP | 09262629 A | 10/1997 | |
| JP | 2000186617 A | 7/2000 | |
| JP | 2002026201 A | 1/2002 | |
| JP | 2003214717 A | 7/2003 | |
| JP | 2004195720 A | 7/2004 | |
| JP | 2006061924 A | 3/2006 | |
| WO | 8707538 A1 | 12/1987 | |
| WO | 9424067 A1 | 10/1994 | |
| WO | 9429047 A1 | 12/1994 | |
| WO | 9508416 A1 | 3/1995 | |
| WO | 9939889 A1 | 8/1999 | |
| WO | 0050209 A1 | 8/2000 | |
| WO | 2005065769 A1 | 7/2005 | |
| WO | 2006078385 A2 | 7/2006 | |
| WO | 2007038385 A2 | 4/2007 | |

OTHER PUBLICATIONS

International Preliminary Report for PCT Application No. PCT/US2006/037169, mailed Dec. 21, 2007, 16 pages.

International Preliminary Report on Patentability for corresponding International Application No. PCT/US2008/070620, mailed Jan. 28, 2010, 7 pages.

Office Action and pending claims for U.S. Appl. No. 11/233,708, mailed May 16, 2005, 11 pages.

Walczyk et al., "Rapid Tooling for Sheet Metal Forming Using Profiled Edge Laminations—Design Principles and Demonstration", Transactions of the ASME, vol. 120, Nov. 1998, pp. 746-754.

Wimpenny et al., "Rapid Laminated Tooling", Journal of Materials Processing Technology, 2003, pp. 214-218.

Walczyk et al., "A New Rapid Tooling Method For Sheet Metal Forming Dies", Laboratory for Manufacturing and Productivity, Massachusetts Institute of Technology, pp. 275-289.

International Search Report and Written Opinion for PCT Application No. PCT/US05/45712, mailed Apr. 2, 2007, 12 pages.

International Search Report and Written Opinion for PCT Application No. PCT/US2006/037169, mailed Apr. 10, 2007, 18 pages.

Notice of Allowability from copending patent application U.S. Appl. No. 11/037,615, mailed Aug. 2, 2007, with allowed claims, 6 pages.

European Search Report, Supplementary European Search Report, and European Search Opinion for copending Application No. 05854432.1, mailed Sep. 29, 2009, 9 pages, and pending claims, 2 pages.

International Search Report and Written Opinion for corresponding PCT Application No. PCT/US2008/070620, mailed Nov. 14, 2008, 13 pages.

Japanese Office Action for corresponding Application No. 2007-551264, mailed Oct. 18, 2011, 2 pages.

* cited by examiner

COMPOUND MOLD TOOLING FOR CONTROLLED HEAT TRANSFER

CROSS-REFERENCE TO RELATED APPLICATIONS

This application is a continuation-in-part of U.S. application Ser. No. 11/484,475 filed Jul. 11, 2006, abandoned, which, in turn, is a continuation-in-part of U.S. application Ser. No. 11/037,615 filed Jan. 18, 2005, now U.S. Pat. No. 7,278,197, and is a continuation-in-part of U.S. application Ser. No. 11/233,708 filed Sep. 23, 2005, abandoned; the disclosures of these applications are incorporated in their entirety by reference herein.

BACKGROUND OF THE INVENTION

1. Field of the Invention

The invention relates to tools for molding articles, more particularly to tools that incorporate cooling into the forming of the article.

2. Background Art

The prior art provides various tools for forming articles, by various forming processes, such as injection molding, blow molding, reaction injection molding, die casting, stamping and the like. These tools often utilize a first mold half and a second mold half, each having opposing forming surfaces for collectively forming an article therebetween. The mold halves are often formed separately, and one half translates relative to the other for closing, forming the article, opening, removing the article and repeating these steps.

Often, mold halves are each formed from a solid block of material that is capable of withstanding the stresses, pressures, impacts and other fatigue associated with the associated forming processes. Various forming processes involve heating the material of the article in order to mold the article to the forming surfaces of the mold halves. Often times, one or more of the mold halves are cooled in order to enhance the rate of solidification of the material of the article and to reduce the cycle time of the molding process. A mold half is often cooled by fluid that is conveyed through a fluid line in the mold half. Fluid lines are often provided within molds or mold halves by drilling a fluid line through the solid mold block.

SUMMARY OF THE INVENTION

A first embodiment of the invention provides a tool for forming an article in a molding operation. The tool has a tool body formed from a non-particulate material. A particulate material is bonded to the body so that the body and particulate material provide a forming surface for forming the article. The particulate material or the particulate material and the tool body collectively provide a duct for conveying a fluid for transfer of heat with the forming surface through the tool body and the heat transfer material during the molding operation.

Another embodiment of the invention provides a tool for forming an article in a molding operation. The tool has a tool body formed from a non-particulate material with a cavity. The particulate material is disposed in the cavity. A heat transfer material having a coefficient of thermal conductivity that is greater than that of the first material and the particulate material are disposed in the cavity bonding the particulate material to the tool body. The tool body and particulate material provide a forming surface for forming the article. The particulate material and the heat transfer material collectively provide a heat transfer region for a transfer of heat from the forming surface to the heat transfer material during the molding operation.

Yet another embodiment of the invention provides a method for forming a molding tool wherein a tool body is provided from a first material. A particulate material is placed in contact with the tool body to provide a tool with a forming surface for forming an article in a molding operation and for providing a duct. A heat transfer region is cast from a third material into the particulate material for transfer of heat between the forming surface and the heat transfer region during a molding operation. The third material has a coefficient of thermal conductivity greater than that of the first material and the particulate material. The third material also has a melting temperature less than that of the first material and the particulate material.

The above embodiments, and other embodiments, aspects, objects, features, and advantages of the present invention are readily apparent from the following detailed description of embodiments of the invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
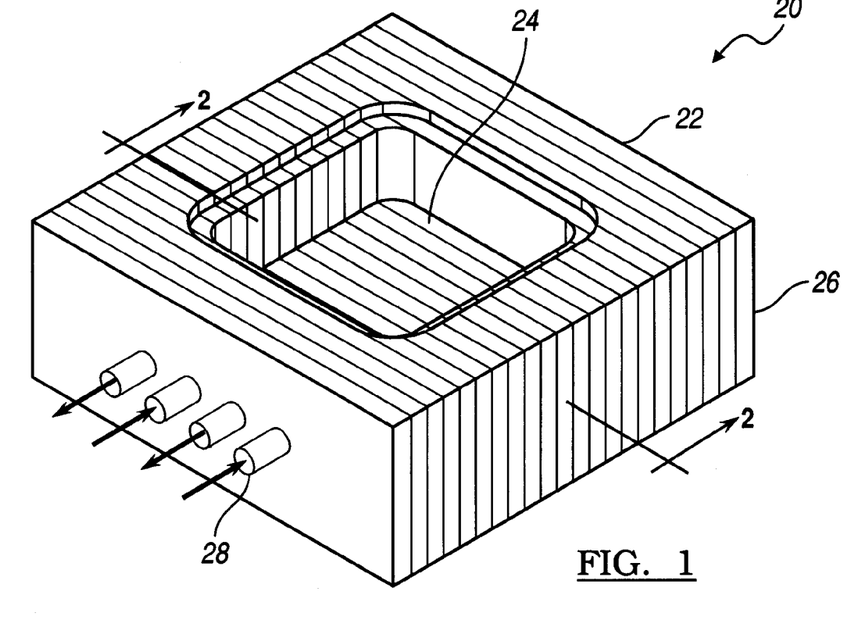
FIG. 1 is perspective view of a tool in accordance with the present invention.

With reference now to FIG. 1, a tool is illustrated in accordance with the present invention and is referenced generally by numeral 20. The tool 20 is a tool for forming an article in a molding operation, such as injection molding, blow molding, vacuum molding, reaction injection molding, rotary molding, die casting, stamping, or the like. Alternatively, the tool may be a mandrel that is shaped similar to the article for forming a molding tool, a die casting tool, a stamping tool or the like, which is then employed for forming the article. Although one tool 20 is illustrated, the invention contemplates the tool 20 may be a mold member, which is utilized in combination with one or more mold members, such as an opposed mold half for forming an article collectively therebetween.

The tool 20 includes a tool body 22, which has a forming surface 24 for forming the article. The tool body 22 may be formed from a solid block that is roughly machined to a near net shape. Alternatively, the tool body 22 may be formed from a multiple layer process, for example, a laminate process, such as that disclosed in U.S. Pat. No. 6,587,742 B2, which issued on Jul. 1, 2003 to Manuel et al.; U.S. Pat. No. 5,031,483, which issued on Jul. 16, 1991 to Weaver; and U.S. Pat. No. 7,021,523 B2, which issued on Apr. 4, 2006 to Manuel et al.; the disclosures of which are incorporated in their entirety by reference herein.

As illustrated, in at least one embodiment the tool body 22 may be provided by a series of laminate plates 26. The tool 20 is equipped with a series of fluid lines 28 for conveying fluid through the tool 20 for heating and/or cooling the forming surface 24. For example, the tool body 22 may be formed of a material such as stainless steel, which has limited conductivity. In order to control heating and/or cooling of a part formed by the tool 20, a rate of heat transfer of the working surface 24 may be enhanced and controlled by conveying fluid through the fluid lines 28. For example, a heated fluid, such as heated oil may be pumped through the fluid lines 28 to heat the working surface 24 to a predefined temperature for maintaining a temperature of a material within the tool, such as a polymeric material in an injection molding process. Likewise, coolant may be conveyed through the fluid lines 28 for cooling the work surface 24 thereby solidifying the material of the article formed by the tool. Such controlled coolant is utilized for providing uniform heating and/or cooling of an article formed within the tool 20. The controlled rates of heat transfer can be employed for limiting internal stresses of a resultant product and limiting sink, shrink and warpage of the product. Such control consequently enhances an overall quality of the resulting product. Additionally, the cycle time may be significantly reduced for improving the output volume of components fabricated by the particulate tool 20.

Figure 2:
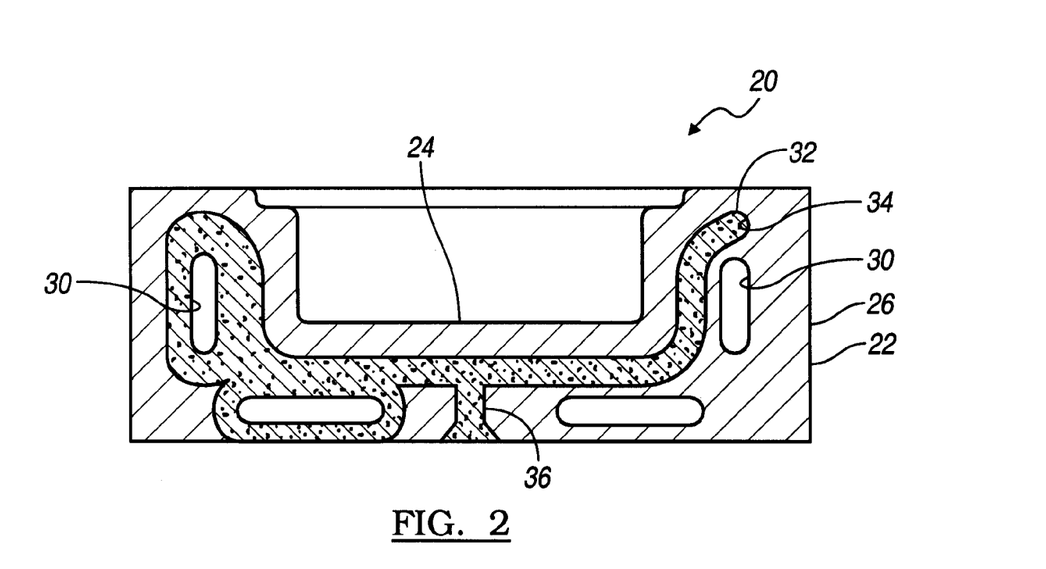
FIG. 2 is a section view of the tool of FIG. 1, taken along section line 2-2.

Referring now to FIG. 2, the tool 20 is illustrated sectioned along section line 2-2 for revealing ducts 30 formed within the tool body. The ducts 30 are segments of the fluid lines 28 and are shaped to provide conformal cooling to the forming surface 24 of the tool body 22. The ducts 30 may be cut into the laminate sheets 26 individually for collectively providing paths of fluid flow for fluid within the fluid lines 28. The ends of the fluid lines 28 may be capped with a fitting for coupling a fluid source to the tool 20.

A heat transfer region 32, in one embodiment that is depicted on the right side of FIG. 2, is disposed between the forming surface 24 and the ducts 30 through the tool body 20 for enhancing the rate of heat transfer between the forming surface 24 and the ducts 30. Since the tool 20 illustrated in FIGS. 1 and 2 has been formed from a multi-layer process of laminate sheets 26, the heat transfer region 32 may be provided in a shape that is contoured to match a contour of the forming surface 24 of the tool 20. The heat transfer region 32 is provided within a cavity 34 formed through the tool body 22. The heat transfer region 32 includes a combination of a particulate material, such as powder metal and a highly conductive metal. The conductive material may be a material, such as copper, that has an enhanced coefficient of thermal conductivity relative to the structural material utilized for the tool body 22 and the particulate material utilized in the heat transfer region 32. The tool body 22 is designed to withstand stresses, pressures and fatigue associated with the forming process of the tool body 22. The cavity 34 may be further supported by the powder metal material, and the conductive material may be designed for conducting heat from the work surface 24 to the ducts 30, or from the ducts 30 to the forming surface 24.

The powder metal may be formed of a structural metal and may be formed of similar material to that of the tool body 22. For example, if the tool body 22 is formed from stainless steel, the powder metal may be formed from a similar metal, such as a steel alloy or stainless steel.

The highly conductive material of the heat transfer region 32 may be provided by laminate or foil sheets of the highly conductive material that are disposed within the laminate sheets 26 of the tool body 22 and subsequently brazed into the cavity 34. Alternatively, the highly conductive material may be cast into the tool body 22 into the cavity 34 formed within the tool body 22, or formed through multiple laminate sheets 26 of the tool body 22. In one embodiment, a runner 36 may be provided within the cavity 34 for permitting the conductive material to seep into the cavity 34. Alternatively, the conductive material 32 may be permitted to pass through tolerance gaps between the laminate sheets 26 by capillary action. In order to prevent the conductive material from seeping into the ducts 30, tubing may be placed into the ducts 30 during assembly of the tool body 22. Alternatively, a particulate material with a higher melting temperature, such as sand, may be provided within the ducts 30 during the casting process to prevent the conductive material from seeping into the ducts 30. The sand may be subsequently removed by vibration of the tool 20, imparting fluid into the fluid lines 28, submerging of the tool 20 within a fluid, or by any suitable particulate material removal process.

Referring to the left side of FIG. 2, the heat transfer region 32 is illustrated surrounding the ducts 30 such that the ducts 30 are in direct contact with the heat transfer region 32. Additionally, the ducts 30 are sealed by the heat transfer region 32 as the highly conductive material is cast into the cavity 34. The ducts 30, in one embodiment, may be tubing that is disposed through the cavity 34 and mounted to the tool body 22 by the heat transfer region 32. Thus, the highly conductive material of the heat transfer region 32 may bond the powder metal to the tool body 22 and to the tubing 30.

The tool body 22, with laminate plates 26, tubing 30 and conductive material in the heat transfer region 32 may be manufactured and assembled similar to similar components disclosed in U.S. Published Patent Application No. 2006/0249872 A1, which published on Nov. 9, 2006 to Manuel et al.; the disclosure of which is incorporated in its entirety by reference herein.

Casting the conductive material into a cavity that is filled with a metallic particulate material, such as powder metal, permits utilization of a larger heat transfer region 32 with reduced failure to the forming of the tool 20. For example, for larger cavities, it is difficult to retain the liquid copper within the cavity during the brazing and/or casting operation. Thus, by the addition of the powder metal, the molten copper is suspended and retained within the cavity 34 by capillary action during cooling and solidification of the copper.

Once the tool body 22, is assembled with tubing 30 within the cavity 34, the powder metal, such as stainless steel powder, is inserted within the cavity 34. One suitable powder range size is 325 mesh to 30 mesh. Testing of the process has revealed that powder size ranging from 50 mesh to 40 mesh results in a suitable combination of powder metal and conductive material. Spherical atomized powder maximizes the contact surface area of the powder, thereby providing consistency in the resulting structure. Oxide free stainless steel powder enhances of the bond of the powder metal by utilizing particles that are free of corrosion.

The tool body 22 may be vibrated to ensure that the powder metal fills all the voids within the cavity 34. Then, the highly conductive material, such as copper, is cast or brazed into the tool thereby filling the cavity 34 and providing the heat transfer region 32. In large cavities, if the molten copper stays warm, it may leech away or drain from the cavity 34. However, due to the combination with the powder metal, the copper is retained and the copper collectively provide the heat transfer region 32. One such suitable combination provides a heat transfer region 32 that is sixty percent stainless steel and forty percent copper, which can be obtained by utilizing stainless steel powder metal of 50 to 40 mesh. The combination of sixty percent stainless steel and forty percent copper provides a cellular structural support, while providing the thermal conductivity of copper. Additionally, the duct 30 is sealed by preventing voids in the heat transfer region 32 by preventing the copper from leeching away.

By utilization of powder metal within the heat transfer region 32, the tubing 30 may be left empty during the casting or brazing process. Copper is acidic and leeches iron out of the tubing 30. The copper is saturated within the powder and therefore the occurrences of the copper burning through the tubing 30 are minimized. Additionally, utilization of sand within the tubing 30 retains a high temperature within the tubing 30 during the casting process due to the insulation properties of sand, thereby causing the heat transfer region 32 to be in a molten state for a longer period of time. It may lead to warpage, voids, other imperfections or failures. By eliminating the use of sand, the solidifying process is enhanced thereby improving the quality and minimizing the occurrences of failure. Additionally, by leaving the tubing 30 open to the furnace environment, the inside of the tubing is cleaned with the cooling gas, such as hydrogen, within the furnace thereby minimizing subsequent cleaning steps.

In another embodiment, the heat transfer region 32 may be provided without a highly conductive material, wherein the powder metal is pressed and sintered to be bonded to the tool body 22. In such an embodiment, the powder metal provides the heat transfer region 32 by providing an enhanced engagement between the tool body 22 and the ducts 30 that is not otherwise provided in laminate tooling.

Another advantage of utilizing the powder metal within the heat transfer region 32 is that even if there is a failure in the tool 20 during the manufacturing process at a different region, the powder metal retains the molten copper within the heat transfer region 32 by capillary action and thereby prevents failure of the heat transfer region 32.

In another embodiment, a woven sleeve, such as a woven stainless steel sleeve, can be disposed about the tubing 30 and the highly conductive material, such as copper may be cast into the heat transfer region 32 about the sleeve.

Although the heat transfer region 32 is depicted spaced apart from the forming surface 24, the invention contemplates that the heat transfer region 32 or the powder metal without a heat transfer material forms a portion of the forming surface 24.

Figure 3:
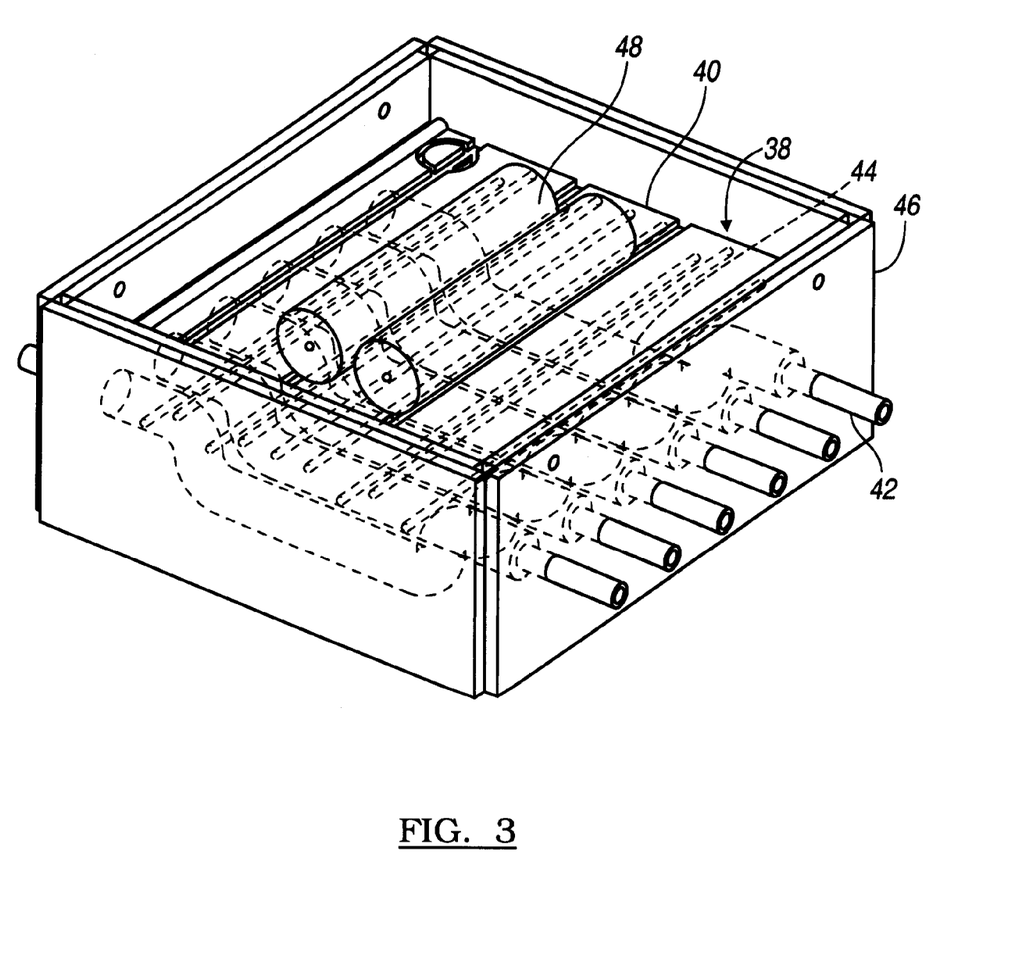
FIG. 3 is a perspective view of another tool in accordance with the present invention, illustrated during a manufacturing process.

With reference now to FIG. 3, another tool embodiment is illustrated in accordance with the present invention and is referenced generally by numeral 38. The tool 38 may be a laminate tool, such as the tool 20 illustrated in FIGS. 1 and 2. The tool 38 includes a tool body 40, which has a forming surface for forming an article on an underside. The tool body 40 may be formed from a multiple layer process, for example, a laminate process, such as those disclosed in U.S. Pat. Nos. 6,587,742 B2; 5,031,483; and 7,021,523 B2.

The tool 38 is illustrated assembled with fluid lines 42, which are provided by tubes disposed within cavities 44 in the tool body 40. The tool body 40 is illustrated assembled to a carrier box 46 for the casting/brazing process. The carrier box 46 has five sides, with an open top and may be welded or otherwise assembled to the tool body 40. The carrier box 46 may be temporarily connected to the tool body 40 for removal after the process and may be welded at the seams to retain the molten material. Bars 48 of conductive material are placed upon the tool body 40. The tool 38 and carrier box 46 are placed within a furnace for melting the bars 48, which are thereby cast and/or brazed into the tool body 40 thereby filling the cavities 44 and creating a heat transfer region about the fluid lines 42. Additionally, if the tool body 40 is a laminate tool, the bars 48 may braze the laminate sheets together. For a more detailed description of the casting and/or brazing process, please refer to the Manuel et al. U.S. Published Patent Application No. 2006/0249872 A1, which was incorporated by reference herein.

Figure 4:
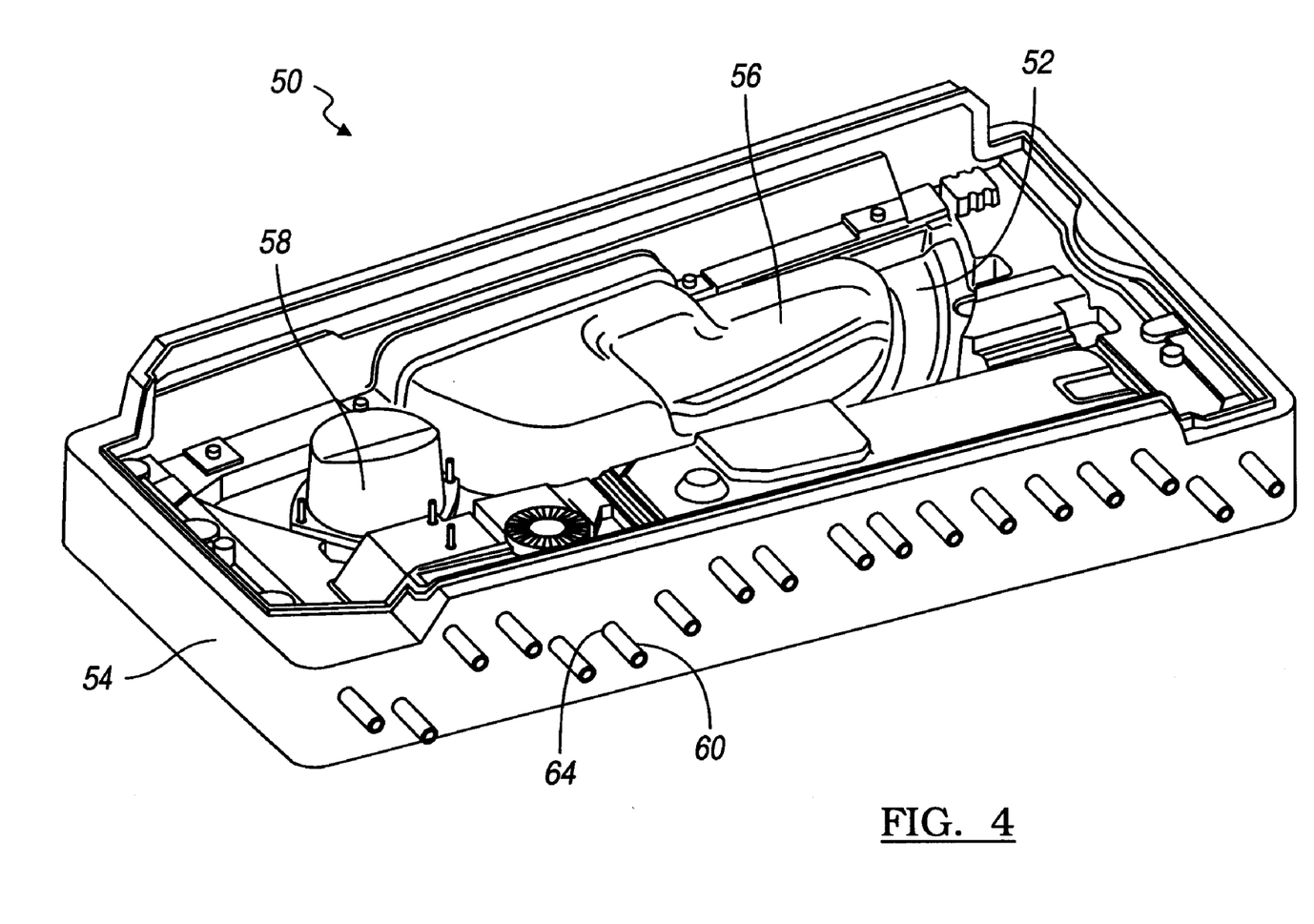
FIG. 4 is a perspective view of another tool embodiment in accordance with the present invention.

In FIG. 4, another tool 50 is illustrated in accordance with the present invention. The tool 50 may be utilized, in one embodiment, with a corresponding mold half for collectively forming an interior door panel by a molding operation with an injection molding machine. The tool 50 may also be utilized alone for molding the door panel. The tool 50 may be formed from a laminate process or may be formed from a solid block that is machined. The tool 50 is illustrated with a forming surface 52 that is provided in a tool body 54, with appropriate contours for forming the article in the desired shape. For example, the forming surface 52 provides a mating face for a finished door panel with such door panel components as an armrest 56 and a speaker housing 58. The forming surface 52 may be a near net shape in the illustrated stage of manufacturing, for subsequent machining to a final forming surface.

Figure 5:
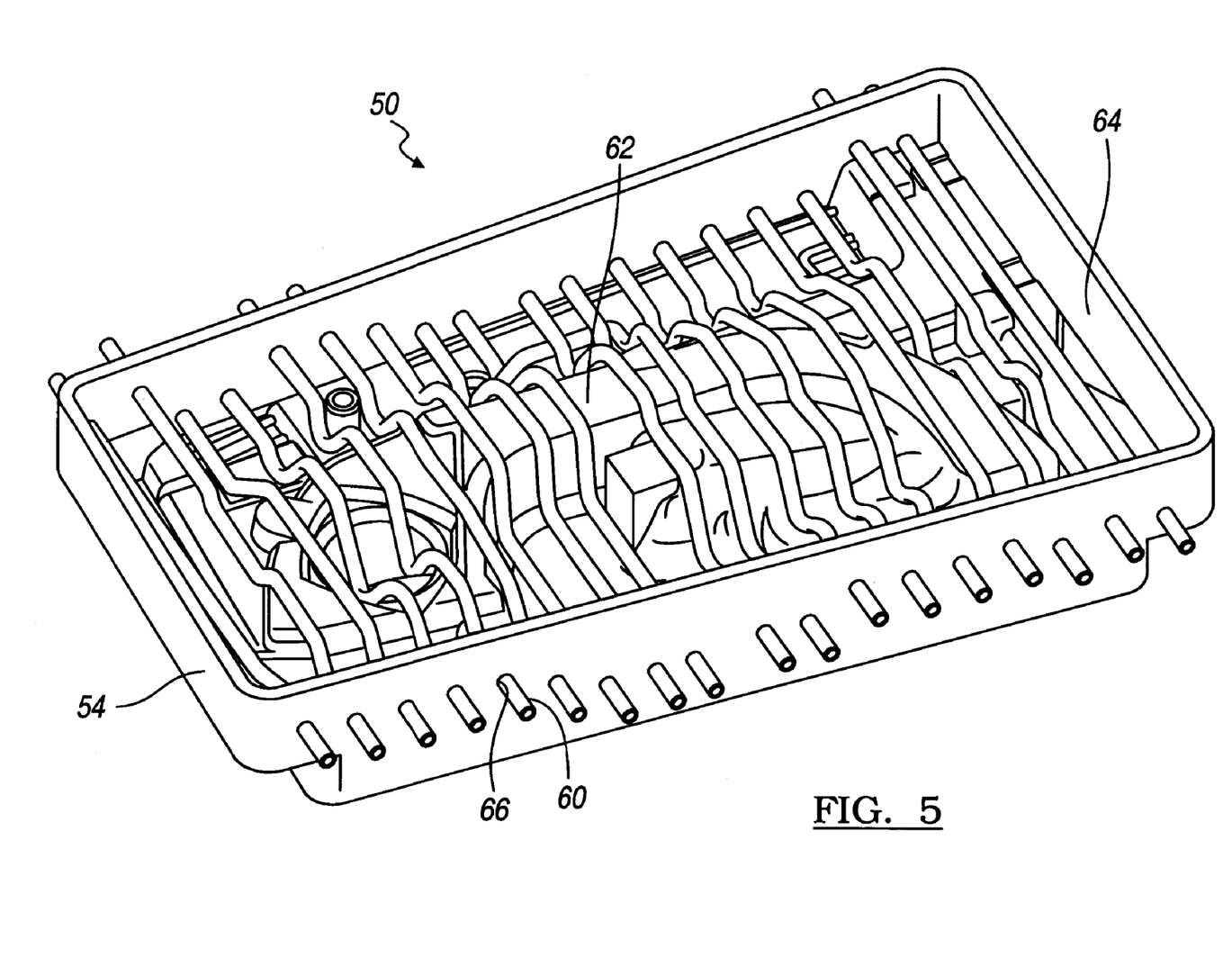
FIG. 5 is another perspective view of the tool of FIG. 4.

The tool body 54 is illustrated with a series of fluid lines 60 extending from the tool 50. As discussed with prior embodiments, the fluid lines 60 are employed for controlled heat transfer of the forming surface 52. Referring now to FIG. 5, a backside of the tool 50 is illustrated with a back surface 62 that is spaced apart from the forming surface 52. The back surface 62 may be spaced a desired thickness from the forming surface 52 for controlled heat transfer. In one embodiment, the back surface 62 is spaced uniformly from the forming surface 52 for uniform heat transfer between the forming surface 52 and the fluid lines 60. The back surface 62 may be formed in the tool body 54 by machining; or a portion of the back surface 62 may be cut into each laminate sheet to collectively provide the back surface 62. The back surface 62 may also be provided within a cavity 64 in the tool body 54.

The fluid lines 60 are each shaped to be generally uniformly spaced apart from the back surface 62. The fluid lines 60 may be formed from steel with a wall thickness of approximately 0.06 inches, which is adequate to withstand an infiltration of the conductive material during the casting operation. Alternatively, flexible or corrugated tubing may be utilized. The fluid lines 60 may be contoured by manual cold forming processes, automated processes, or any suitable shaping process. Additionally, the fluid lines 60 are adequately spaced relative to one another to suitably cool or heat the forming surface 52. The fluid lines 60 may be supported by spacers, or may be supported by apertures 66 that are formed in the tool body 54.

After the fluid lines 60 are assembled to the tool body 54, a heat sink may be added to the back surface 62 in the cavity 64. The heat sink includes a powder metal that is displaced about the back surface 62 in engagement with the fluid lines 60. The heat sink also includes a conductive material that may be cast into the cavity 64, as disclosed with prior embodiments, for engagement with the back surface 62 and the fluid lines 60 for enhancing the rate of heat transfer between the forming surface 52 and the fluid lines 60. For example, the tool body 54 may be formed from stainless steel and the heat sink material also includes a highly conductive material such as copper that is cast into the cavity 64 as disclosed in prior embodiments for conducting heat to and from the tool body 54 and the fluid lines 60. For example, copper has a coefficient of thermal conductivity of 390 W/m·K (Watts per meter·Kelvin), which is greater than that of tool steel which has a coefficient of thermal conductivity of 25-35 W/m·K.

Figure 6:
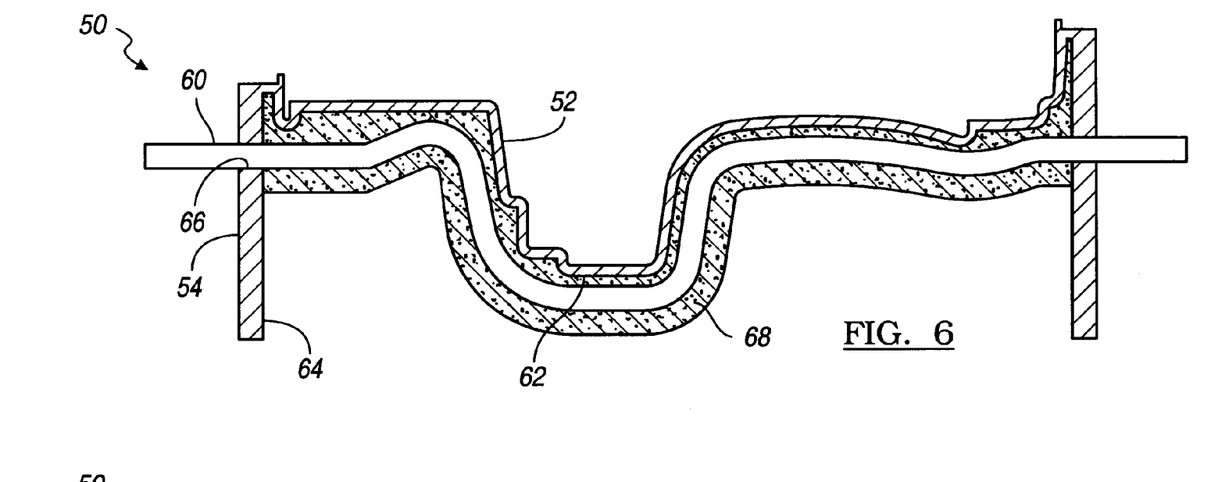
FIG. 6 is a partial section view of the tool of FIG. 4.
Figure 7:
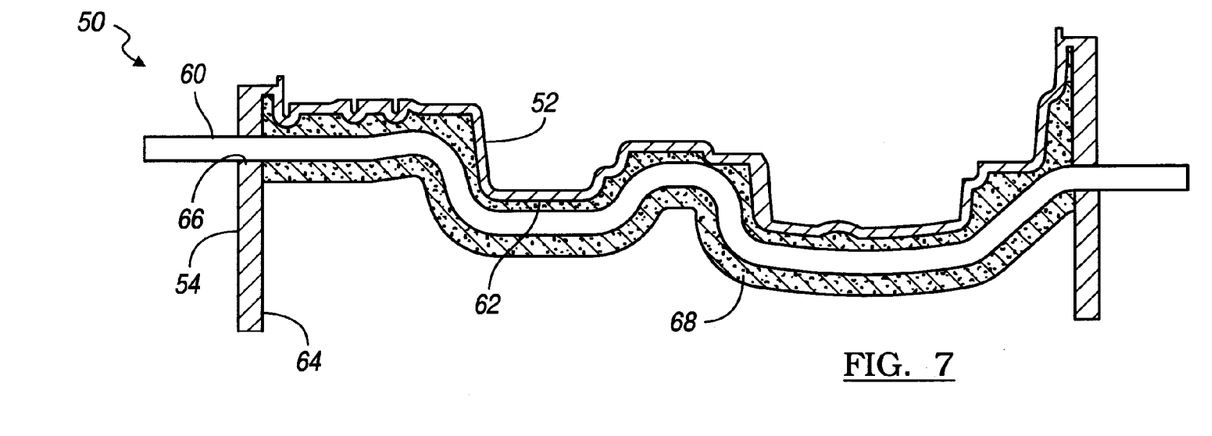
FIG. 7 is another partial section view of the tool of FIG. 4.

FIGS. 6 and 7 illustrate separate partial section views of the tool 50 taken through the tool body 54. Each view is illustrated adjacent one of the fluid lines 60. As illustrated, the tool body 54 is sized to adequately withstand the fatigues associated with the corresponding molding operation. The back surface 62 is spaced generally uniform from the forming surface 52 for adequately providing the surface characteristics required for the forming operation. The offset of the back surface 62 from the forming surface 52 is optimized for performing the molding operation while minimizing the conductive resistance provided by the tool body material.

FIGS. 6 and 7 illustrate examples of how the fluid lines 60 may be contoured relative to the corresponding back surface 62. The fluid lines 60 are encased within the heat sink 68 due to the addition of powder metal and the casting of the conductive material. The heat sink 68 may also be conformed within the cavity 64 to the shape of the back surface 62 by utilization of a tool body insert during the casting operation that is integrated into the tool body 54 or subsequently removed as illustrated.

Figure 8A:
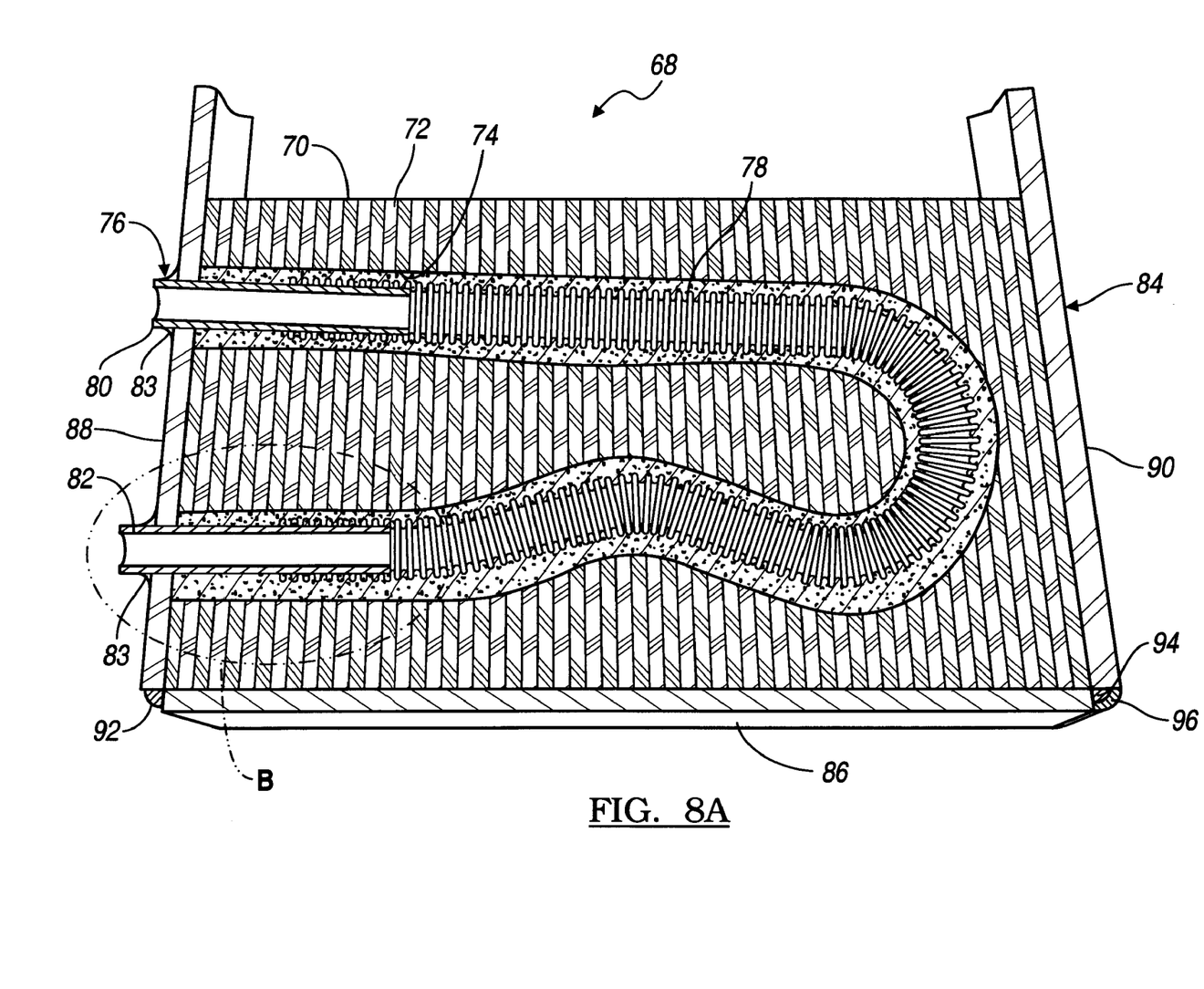
FIG. 8A is partial section view of another tool embodiment in accordance with the present invention.

Referring now to FIG. 8A, another tool embodiment is illustrated and referenced generally by numeral 68. The tool 68 has a tool body 70 formed from a series of laminate plates 72. The tool body 70 provides a forming surface that is not shown in this section view of the tool 68. The tool body 70 collectively provides a cavity 74 through the series of laminate plates 72. A fluid line 76 is illustrated mounted within the cavity 74. The fluid line 76 includes a piece of flexible tubing 78 for conformally cooling and/or conformally heating the tool 68. The flexible tubing 78 may be a corrugated stainless steel tubing with a wall thickness of approximately 0.02 inches. In other embodiments, other suitable wall thicknesses are contemplated within the scope of the invention. The flexible tubing 78 may be oxidized to inhibit the molten conductive material from burning through the tube 78. The corrugated tubing 78 provides flexibility to the tubing for assembly of varying conformal cavities 74. The corrugated tubing 78 also causes turbulence to fluid forced therethrough for enhanced heat transfer from the tube 78 to the fluid passing therethrough. Of course, the flexible tubing 78 may be formed from any suitable material, such as brass which may melt with the conductive material formed integrally therein about a limiter provided within the tubing 78, such as sand.

Figure 8B:
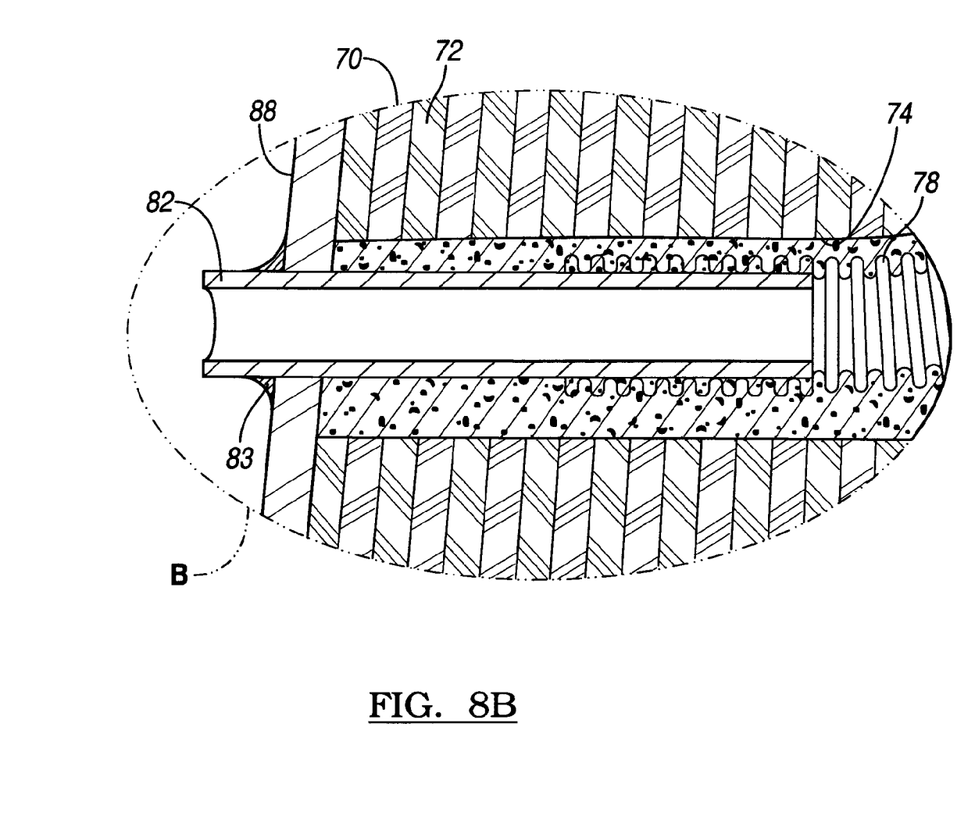
FIG. 8B is an enlarged partial section view of a portion of the tool of FIG. 8A.

A rigid tube 80, 82 is mounted to each distal end of the flexible tubing 78 to extend out of the tool body 70 for subsequent addition of a fitting. The rigid tubes 80, 82 may each be welded to the tool body 70 by a 2101 Stainless Steel TIG (tungsten inert gas) weld 83, in order to secure the location of each rigid tube 80, 82. In order to provide a fluid communication seal between the rigid tubes 80, 82 and the flexible tubing 78, the rigid tubes 80, 82 are mounted to the flexible tubing 78. In one embodiment, the rigid tube 80 is welded to the flexible tubing 78 to provide a sealed fluid communication and to prevent infiltration of a thermally conductive material that is subsequently cast into the tool body 70. In another embodiment, the flexible tubing 78 is pressed about the rigid tube 80 to form a mechanical seal therebetween. Alternatively, and as illustrated in FIG. 8B, the rigid tube 82 may be inserted a predefined distance into the flexible tubing 78 to provide a labyrinth seal. The copper infiltrates the connection of the rigid tube 82 and the flexible tubing 78, but does not extend past the connection due to the length of the insertion of the rigid tube 82 within the flexible tubing 78. After the fluid lines are assembled, powder metal is inserted into the cavity 74. Subsequently, the thermally conductive material, such as copper is cast and/or brazed into the tool body 70. The weld connection in one embodiment (rigid tube 80), the pressed connection in another embodiment (rigid tube 82) and the labyrinth seal of another embodiment (rigid tube 82) each prevent the copper from infiltrating the fluid line 76.

Referring again to FIG. 8A, the tool 68 is illustrated including a carrier box 84 according to at least one embodiment of the invention. The carrier box 84 retains the laminate plates 72 during the casting process, as discussed above with reference to FIG. 3. The carrier box 84 has a sufficient number of sides to enclose the laminate plates 72 and to retain the bars of conductive material that are cast and brazed into the tool 68. For example, the carrier box 84 may include five sides with an open top; and the sides may include a bottom wall 86 with sidewalls 88, 90.

The carrier box 84 may be formed from any suitable material, such as hot-rolled steel (HRS). The thickness of the carrier box 84 is determined by size and weight of the tool 68 that the box 84 must support. Various testing has determined that a 2101 Stainless Steel TIG weld 92 (left side of FIG. 8A) is sufficient for joining and sealing carrier box walls 86, 88 that are formed from HRS with a thickness of one-eighth of an inch to one-quarter of an inch. Likewise, testing has determined that a 2101 Stainless Steel TIG weld 94 (right side of FIG. 8A) that is backfilled with a steel MIG (metal inert gas) weld 96 (also on the right side of FIG. 8A) provides an adequate weld for joining and sealing carrier box walls 86, 90 that are formed from HRS with a thickness of three-eighths of an inch to three-quarters of an inch.

Figure 9:
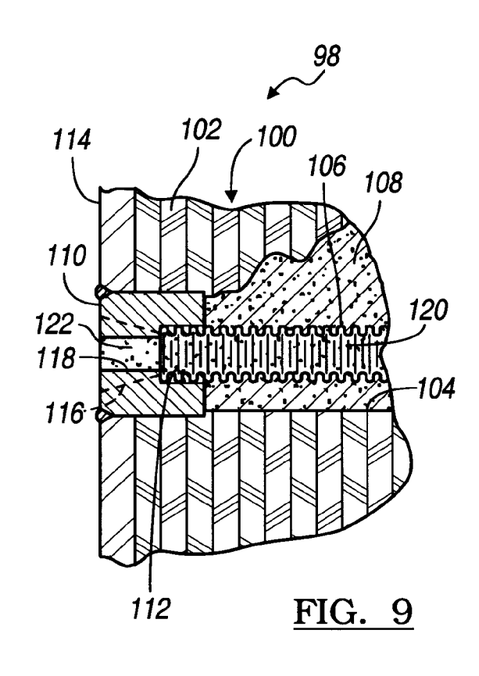
FIG. 9 is an enlarged partial section view of another tool embodiment in accordance with the present invention.

FIG. 9 illustrates a portion of yet another embodiment of a tool 98 in accordance with the present invention. The tool 98 has a tool body 100 formed from a series of laminate plates 102. The laminate plates 102 collectively define a cavity 104. Flexible tubing 106 is inserted into the cavity 104 to provide a fluid line. A heat transfer region 108 is provided in the cavity 104 around the flexible tubing 106. In one embodiment, the heat transfer region 108 includes powder metal stainless steel with copper that is brazed into the powder metal. The flexible tubing 106 is mounted to a fitting 110.

The fitting 110 includes a blind bore 112 for receiving the flexible tubing 106. The flexible tubing 106 may be welded or otherwise fastened to the fitting 110. The weld may seal the connection, or the connection may be sealed otherwise, for example, by being filled with sand prior to the brazing of the conductive material into the heat transfer region 108. The fitting 110 is oriented within the cavity 104 extending through a region of the laminate plates 102. The fitting 110 also extends through a sidewall 114 and is exposed to an external environment of the tool body 100. The sidewall 114 may be one of the laminate plates 102 or a sidewall 114 of an associated carrier box. The fitting 110 is welded to the sidewall 114 to secure the fitting 110 to the tool body 100 and to seal the connection of the fitting 110 to the sidewall 114.

The fitting 110 includes an outside diameter that is adequately sized so that various fitting tap sizes (such as pipe tapped hole 116 shown in phantom) can be subsequently drilled and tapped into the fitting 110 for connecting an external pipe or tubing to the fluid line. Thus, the fitting 110 permits connection of various tap sizes for flexibility in plumbing the associated external fluid line.

The fitting 110, in at least one embodiment, is provided with a through hole 118 prior to the brazing of the conductive material. After the brazing process, the through hole 118 can be further drilled and tapped to form a pipe tap hole 116. The through hole 118 exposes the inside of the flexible tubing 106 to an outside brazing atmosphere within the furnace during the brazing operation. Such exposure oxidizes the flexible tubing 106 to inhibit the molten brazed material from penetrating the flexible tubing 106.

The fluid line, including the fitting 110 and the flexible tubing 106 may be filled with a braze resistant material, such as foundry sand 120 or zircon (zirconium silicate). If any of the molten brazed material, such as copper, penetrates the fluid line, the sand 120 prevents the molten brazed material from filling a portion of the fluid line that would disrupt fluid flow within the fluid line. After the brazing operation, the sand 120 is removed from the fluid line by vibration or the like.

In order to retain the sand 120 within the fluid line during the brazing operation, the fitting may be plugged by a ceramic fiber cap 122, such as Fiberfrax® provided by Unifrax Corporation of Niagara Falls, N.Y. After the fitting 110 is plugged with the ceramic fiber cap 122, a pin hole is formed into the cap 122. The pin hole is adequately small to prevent the sand 120 from leaking from the fitting 110. The pin hole is adequate to permit the brazing atmosphere air within the furnace to pass through the cap 122 and through the flexible tubing 106. The sand 120 has sufficient porosity to permit the air to pass through the flexible tubing 106, thereby oxidizing the flexible tubing 106.

Figure 10:
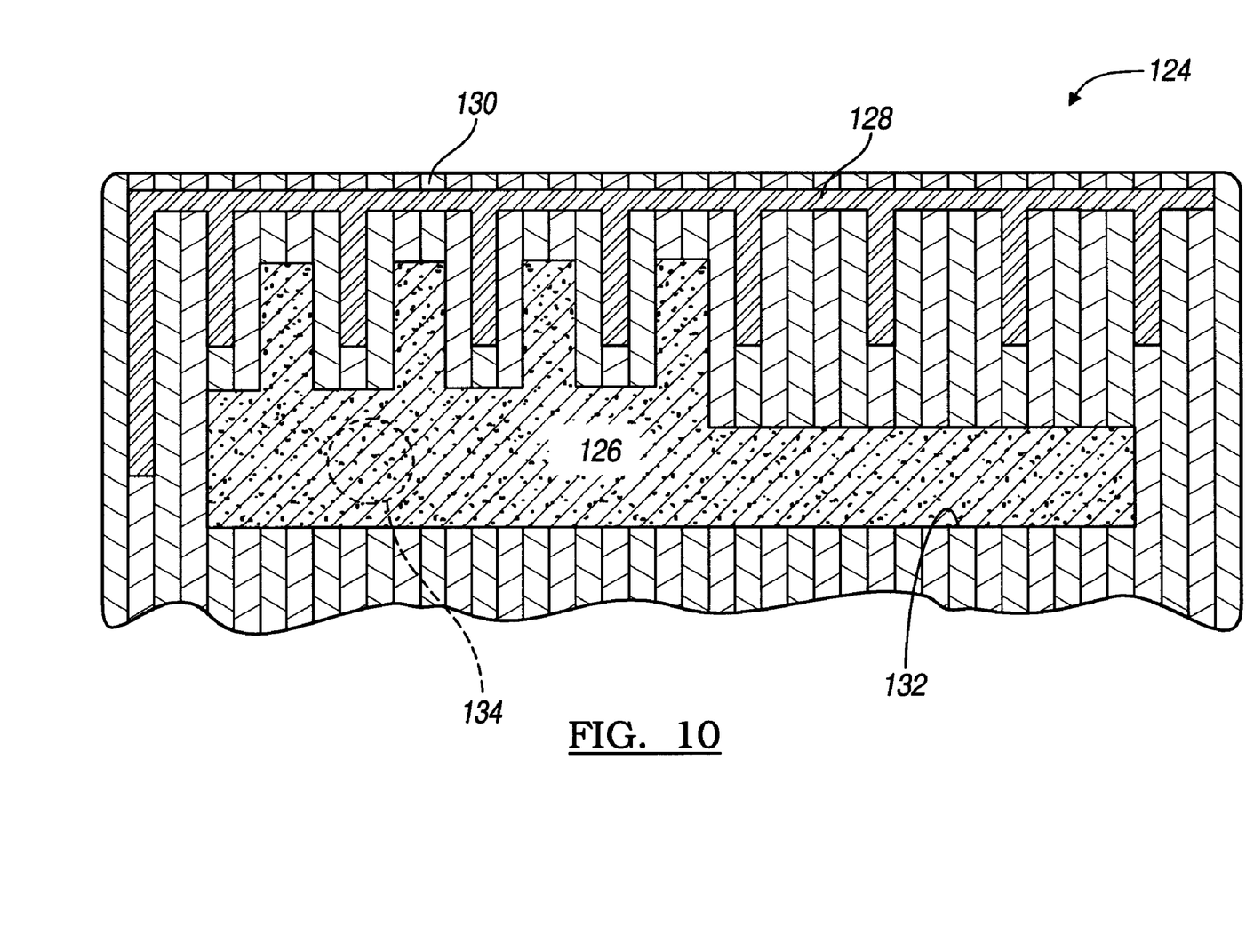
FIG. 10 is a section view of another tool embodiment in accordance with the present invention.

The invention contemplates heat sinks of various complexities. With reference now to FIG. 10, another sectioned tool 124 is illustrated in accordance with the present invention. Heat sinks 126, 128 of varying geometries are provided throughout the body of the tool 124 for providing a controlled heating or cooling of the tool 124 that is specific for the molding operation of the tool 124. The tool 124 is formed from a series of laminate plates 130 wherein the heat sinks 126, 128 extend through the thickness of the laminate plates 130 and also are provided intermittently between the laminate plate 130. In one embodiment, the heat sink 128, which has limited thickness, may be cast or brazed into the tool and formed from copper only. The larger heat sink 126 may be provided from a powder material that is inserted within a cavity 132 and a thermally conductive material such as copper that is then cast or brazed into the powder metal within the cavity 132 thereby forming the heat sink 126.

The heat sink 126 may also be provided with a fluid line 134, which is illustrated in phantom in order to optimize the desired heat transfer characteristics for the molding operation.

Although various examples of tools with particulate materials added to the tool body in combination with various heat sinks, ducting, manufacturing methods and combinations thereof are provided herein, the invention contemplates that various arrangements and combinations can be fabricated in accordance with the present invention. The enhanced cooling and heating characteristics provided herein are adaptable to various molding operation, applications and requirements for forming various articles, thereby providing flexibility, improving, reducing cycle time and enlarging the capabilities of the heat sinks and tools for forming articles.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tool for forming an article in a molding operation comprising:
   a tool body formed from a first non-particulate material; and
   a particulate material bonded to the tool body;
   wherein the tool body, the tool body and the particulate material, or the particulate material provide a forming surface for forming the article;
   wherein the particulate material, or the particulate material and the tool body collectively provide a duct for conveying a fluid for a transfer of heat with the forming surface through the tool body and the duct during a molding operation;
   wherein the tool further comprises a heat transfer material mounted to the tool body and the particulate material, spaced apart from the forming surface, the heat transfer material having a coefficient of thermal conductivity that is greater than that of the first material and the particulate material; and
   wherein the heat transfer material and the particulate material, or the heat transfer material, the particulate material and the tool body collectively provide the duct for conveying a fluid for a transfer of heat with the forming surface through the tool body and the heat transfer material during the molding operation.

2. The tool of claim 1 wherein the duct is sealed by the heat transfer material.

3. The tool of claim 1 wherein the heat transfer material further comprises copper.

4. The tool of claim 3 wherein the first material further comprises a steel alloy.

5. The tool of claim 3 wherein the particulate material further comprises stainless steel.

6. The tool of claim 3 wherein the particulate material further comprises powder metal.

7. The tool of claim 6 wherein the powder metal is sized within a range from 325 mesh to 30 mesh.

8. The tool of claim 6 wherein the powder metal is sized within a range from 50 mesh to 40 mesh.

9. The tool of claim 6 wherein the powder metal is spherical atomized.

10. The tool of claim 6 wherein the powder metal is oxide free.

11. The tool of claim 1 further comprising at least one tube disposed within the duct for conveying the fluid.

12. The tool of claim 11 wherein the at least one tube further comprises flexible tubing disposed within the duct and a rigid tube affixed to a distal end of the flexible tubing for fluid communication therethrough.

13. The tool of claim 11 wherein the at least one tube further comprises flexible tubing disposed within the duct and a fitting welded to the tool body and affixed to a distal end of the flexible tubing for fluid communication therethrough.

14. The tool of claim 13 wherein the fitting has a blind bore for receiving the flexible tubing and an outside diameter sized so that various pipe taps can be formed into the fitting.

15. The tool of claim 11 further comprising:
   a woven stainless steel sleeve disposed about the at least one tube; and a copper heat transfer region that is cast about the sleeve and the tube.

16. The tool of claim 1 wherein the tool body is formed from a plurality of laminate sheets of the first non-particulate material, at least one of the plurality of laminate sheets being shaped to form a cavity in the tool body that is spaced apart from the forming surface.

17. The tool of claim 16 wherein the particulate material is disposed within the cavity.

18. A tool for forming an article in a molding operation comprising:
 a tool body formed from a first non-particulate material; and
 a particulate material bonded to the tool body;
 wherein the tool body, the tool body and the particulate material, or the particulate material provide a forming surface for forming the article;
 wherein the particulate material, or the particulate material and the tool body collectively provide a duct for conveying a fluid for a transfer of heat with the forming surface through the tool body and the duct during a molding operation;
 wherein the tool body is formed from a plurality of laminate sheets of the first non-particulate material, at least one of the plurality of laminate sheets being shaped to form a cavity in the tool body that is spaced apart from the forming surface;
 wherein the particulate material is disposed within the cavity;
 wherein the tool further comprises a heat transfer material having a coefficient of thermal conductivity greater than that of the first material and the particulate material, disposed within the cavity for a transfer of heat from the forming surface to the heat transfer material through the tool body during a molding operation; and
 wherein the duct is formed in the tool body collectively by the cavity of the laminate sheets and the surrounding particulate material for conveying a fluid in the duct, and the duct is in engagement with the heat transfer material for a transfer of heat between the forming surface and the fluid through the tool body and the heat transfer material during a molding operation.

19. The tool of claim 18 further comprising a carrier box provided by a series of plates surrounding the tool body with at least one exposed surface, wherein the plates are formed from steel and are connected and sealed by a 2101 Stainless Steel tungsten inert gas weld that is backfilled with a steel metal inert gas weld.

20. A method for forming a molding tool comprising:
 providing a tool body from a first material;
 placing a particulate material in contact with the tool body so that at least one of the tool body and the particulate material provides a forming surface for forming an article in a molding operation and at least one of the tool body and the particulate material provides a duct; and
 casting a heat transfer region from a third material having a coefficient of thermal conductivity that is greater than that of the first material and the particulate material, and the third material having a melting temperature less than that of the first material and the particulate material, into the particulate material for a transfer of heat between the forming surface and the heat transfer region during a molding operation.

21. The method of claim 20 further comprising:
 forming a cavity in the tool body;
 placing the particulate material in the cavity to form the duct through the cavity; and
 casting the heat transfer material into the particulate material for a transfer of heat between the duct and the heat transfer region during the molding operation.

22. The method of claim 20 further comprising:
 providing at least one tube on the tool body spaced apart from the forming surface;
 placing the particulate material in contact with the at least one tube; and
 casting the heat transfer region into the particulate material in engagement with the at least one tube for mounting the tube to the tool body for a transfer of heat between the forming surface and the tube through the tool body and the heat transfer region during the molding operation.

23. The method of claim 22 wherein the at least one tube is flexible tubing, further comprising mounting a rigid tube to a distal end of the flexible tubing for fluid communication therethrough.

24. The method of claim 23 further comprising welding the rigid tube to the flexible tubing.

25. The method of claim 23 further comprising pressing the flexible tubing to the rigid tube.

26. The method of claim 23 wherein the rigid tube has a blind bore for receiving the flexible tubing and an outside diameter sized so that various pipe taps can be formed into the rigid tube, the method further comprising drilling and tapping a pipe tap into the rigid tube after the heat transfer region is cast.

27. The method of claim 23 further comprising:
 filling the flexible tubing and rigid tube with sand prior to the casting operation;
 capping the rigid tube with a ceramic fiber to retain the sand during the casting operation; and
 forming a hole in the ceramic fiber cap that is sized to retain the sand and permit air to pass through the cap during the casting operation.

28. The method of claim 20 further comprising:
 forming the tool body from a plurality of laminate sheets of the first material, to collectively form a cavity in the tool body that is spaced apart from the forming surface;
 inserting the particulate material into the cavity to provide a duct in the cavity; and
 casting the heat transfer material into the cavity for a transfer of heat between the forming surface and the heat transfer material through the tool body during the molding operation.

29. The method of claim 28 further comprising:
 inserting a tube through the cavity;
 inserting the particulate material into the cavity about the tube in engagement with the tube; and
 casting the heat transfer material into the cavity with the particulate material for a transfer of heat between the forming surface and the tube through the tool body and the heat transfer material during the molding operation.

30. The method of claim 20 further comprising forming an article from the molding tool.

31. A tool formed from the method of claim 20.

32. The method of claim 20 further comprising placing powder metal in contact with the tool body so that at least one of the tool body and the powder metal provides the forming surface and at least one of the tool body and the powder medal provides the duct.

33. The method of claim 32 further comprising providing powder metal that is sized within a range of 325 mesh to 30 mesh.

34. The method of claim 32 further comprising providing powder metal that is sized within a range of 50 mesh to 40 mesh.

35. The method of claim 32 further comprising providing powder metal that is spherical atomized.

36. The method of claim 32 further comprising providing powder metal that is oxide free.

37. The method of claim 20 further comprising:
provide a carrier box by a series of steel plates surrounding the tool body with at least one exposed surface;
welding connections of the carrier box plates with a 2101 Stainless Steel tungsten inert gas weld; and
backfilling the connections with a steel metal inert gas weld.

38. A tool for forming an article in a molding operation comprising:
a tool body formed from a first non-particulate material with a cavity;
a particulate material disposed in the cavity; and
a heat transfer material having a coefficient of thermal conductivity greater than that of the first material and the particulate material, the heat transfer material being disposed in the cavity bonding the particulate material to the tool body;
wherein the tool body, the tool body and the particulate material, or the particulate material provide a forming surface for forming the article; and
wherein the particulate material and the heat transfer material collectively provide a heat transfer region for a transfer of heat from the forming surface to the heat transfer material during the molding operation.

* * * * *